(12) United States Patent
Aldridge

(10) Patent No.: US 8,477,488 B2
(45) Date of Patent: Jul. 2, 2013

(54) REMOVABLE STORAGE SYSTEM AND METHOD

(75) Inventor: Russell W. Aldridge, Austin, TX (US)

(73) Assignee: National Instruments Corporation, Austin, TX (US)

( * ) Notice: Subject to any disclaimer, the term of this patent is extended or adjusted under 35 U.S.C. 154(b) by 380 days.

(21) Appl. No.: 12/973,439

(22) Filed: Dec. 20, 2010

(65) Prior Publication Data

US 2012/0026674 A1 Feb. 2, 2012

Related U.S. Application Data

(60) Provisional application No. 61/368,303, filed on Jul. 28, 2010.

(51) Int. Cl.
*G06F 1/16* (2006.01)

(52) U.S. Cl.
USPC .................................................... 361/679.33

(58) Field of Classification Search
USPC .................................................... 361/679.33
See application file for complete search history.

(56) References Cited

U.S. PATENT DOCUMENTS

| | | | |
|---|---|---|---|
| 4,682,833 A | 7/1987 | Ferchau et al. | |
| 4,833,554 A | 5/1989 | Dalziel et al. | |
| 4,941,841 A | 7/1990 | Darden et al. | |
| 5,065,262 A | 11/1991 | Blackborow et al. | |
| 5,995,376 A * | 11/1999 | Schultz et al. | 361/788 |
| 6,091,571 A | 7/2000 | Hanson | |
| D458,924 S | 6/2002 | Tsuyuki et al. | |
| 6,513,086 B1 * | 1/2003 | Haddad et al. | 710/305 |
| 6,603,657 B2 | 8/2003 | Tanzer et al. | |
| 6,608,755 B2 * | 8/2003 | Baldwin et al. | 361/729 |
| 6,751,094 B2 * | 6/2004 | Kolb et al. | 361/679.33 |
| 7,089,466 B2 * | 8/2006 | Odom et al. | 714/724 |
| 7,149,093 B2 * | 12/2006 | Conway | 361/788 |
| 7,420,801 B2 * | 9/2008 | Behl | 361/679.33 |
| 7,466,543 B2 * | 12/2008 | Wang | 361/679.33 |
| 8,107,244 B2 * | 1/2012 | Reimund | 361/729 |
| 2005/0099766 A1 * | 5/2005 | Fraley et al. | 361/685 |
| 2009/0224640 A1 * | 9/2009 | Yang et al. | 312/223.2 |

OTHER PUBLICATIONS

"PMC ShuttleStor"; ACT Technico; Nov. 2007; 2 pages Obtained from Internet: <http://www.acttechnico.com/pmc_shuttlestor_spec.pdf>.

* cited by examiner

*Primary Examiner* — Lisa Lea Edmonds
(74) *Attorney, Agent, or Firm* — Meyertons Hood Kivlin Kowert & Goetzel, P.C.; Jeffrey C. Hood

(57) ABSTRACT

A removable storage module including a housing that facilitates sliding of the removable storage module into and out of a slot of a modular computer device, wherein the slot includes an opening in a front panel of the modular computer device that enables the removable storage module to be installed into and removed from the slot while the modular computer device is installed in one or more slots of a computer chassis. The removable storage module also includes a latching mechanism that is selectively actuated between a locked and an unlocked position to selectively couple the removable storage module within the slot of the modular computer device during use.

20 Claims, 8 Drawing Sheets

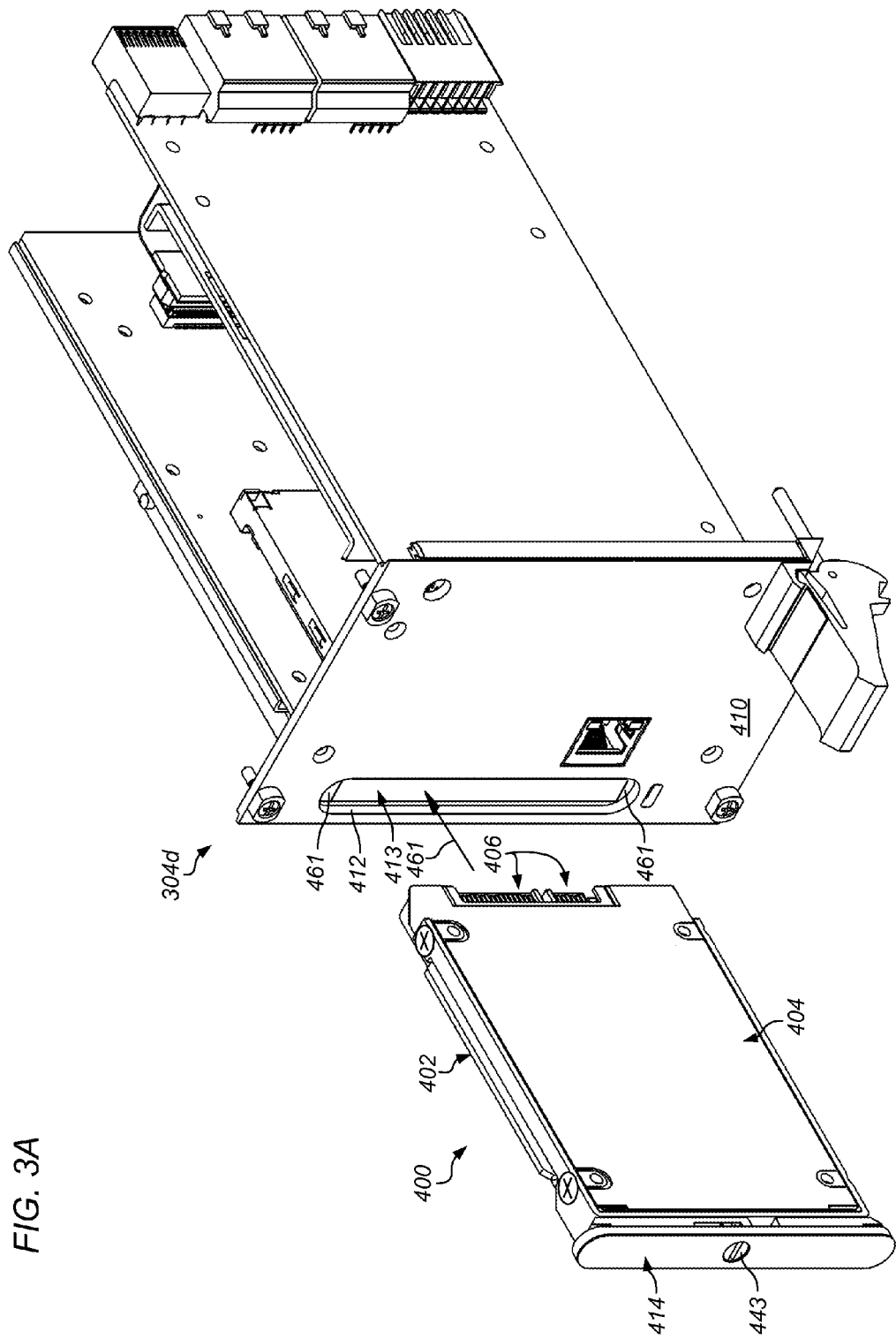

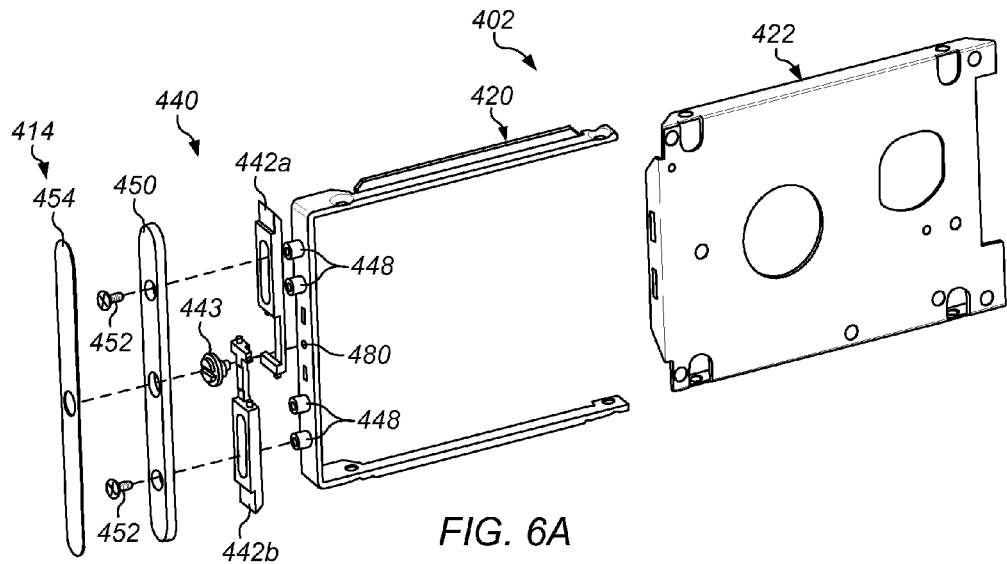
FIG. 6A
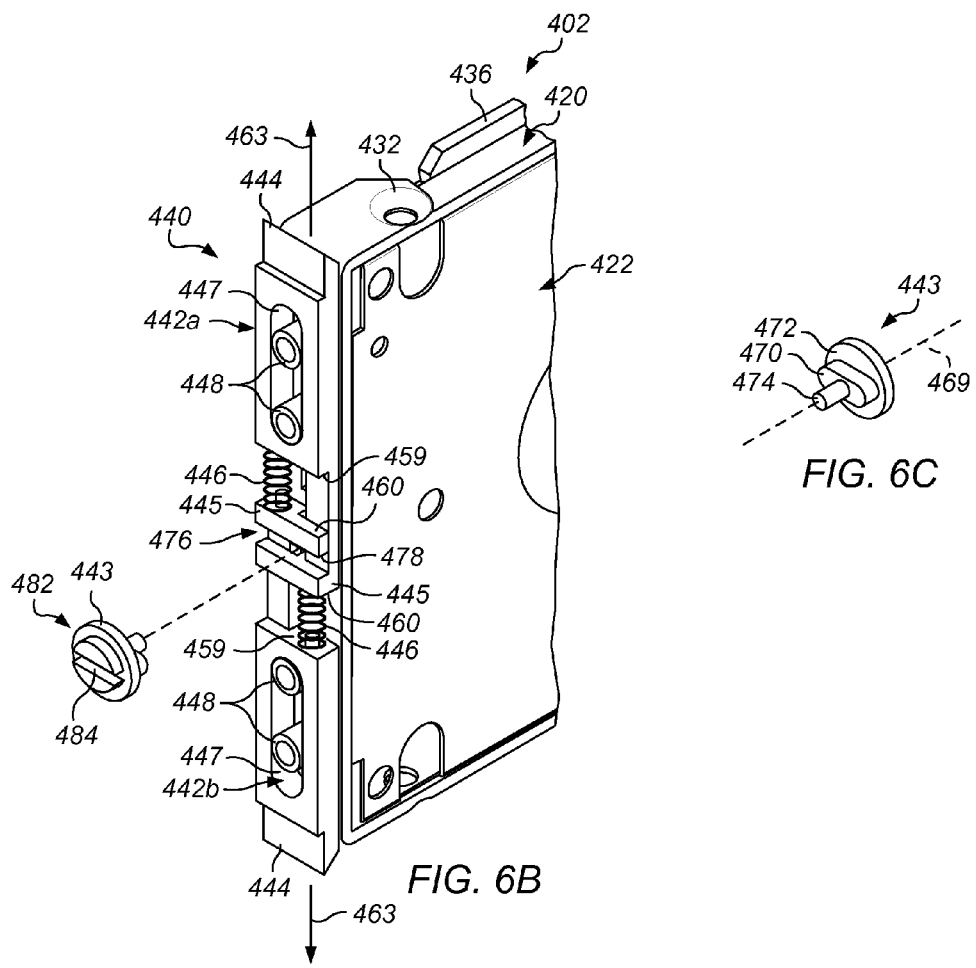
FIG. 6C
FIG. 6B

REMOVABLE STORAGE SYSTEM AND METHOD

PRIORITY

This application claims benefit of priority to U.S. Provisional Patent Application Ser. No. 61/368,303, entitled "Removable Storage System And Method", filed Jul. 28, 2010, by Russell W. Aldridge, which is hereby incorporated by reference in its entirety as though fully and completely set forth herein.

BACKGROUND OF THE INVENTION

1. Field of the Invention

The present invention relates to removable storage devices and more particularly to a system and method for removable storage modules to be installed in and removed from a computer chassis or similar computer device.

2. Description of the Related Art

Computer systems typically include some form of non-volatile storage medium, such as a hard-drive or other memory device. A non-volatile memory device retains information even when power is removed, such as between powering-down and powering-on the computer. Although it is typically desirable that non-volatile memory retain information even when powered down, it may provide an opportunity for unauthorized users to access the data stored in the memory. For example, in a lab environment, even after computers are powered down at the end of a work day, an unauthorized user may attempt to access the memory using the computer, or may even attempt to remove the storage device from the computer. For example, where a test and measurement computer system may include a chassis (e.g., a PXI chassis) having one or more modules (e.g., PXI modules) residing in one or more slots of the chassis, an unauthorized user may simply remove one of the modules containing the storage device. In an attempt to prevent unauthorized access to the storage device, a user may have to remove the storage device when the computer is left unattended for an extended period of time. For example, some research laboratories may require the periodic removal of storage devices from a computer chassis to secure sensitive stored information elsewhere, such as in a safe or storage locker. Thus, at the end of a work day, a user may remove the storage device (e.g., physically remove a hard-drive from a computer or remove a module containing the hard-drive from a computer chassis) and move the storage device to a secure location, such as a locked cabinet. Although removal of a storage device, such as a hard-drive, may be desirable for security purposes, removal of storage devices may be desirable for many other reasons. For example, a computer user may desire to protect the storage data, transport the storage data on the storage device without moving the entire computer system, or simply swap between storage devices.

Typically, computer chassis are not designed to permit removal of storage devices without some form of disassembly of the compute device. For example, fastening mechanisms and safety devices employed on removable computer modules may increase the complexity of removing storage devices. Furthermore, the removal procedures of computer module storage devices, particularly for test and measurement computer systems, are often time-consuming and cumbersome. Current computer systems may require the computer operator to manually remove a number of connecting cables and to unscrew nuts to release the computer module from its mounting in the computer chassis. For example, in a PXI computer system, removal of a controller module may include powering down, removing all cables to the controller, removing controller lock down screws, ejecting the controller, removing HDD screws, and removing the flex connector.

Accordingly, there is a desire for simplified removal and installation of computer storage devices.

SUMMARY

Described herein are embodiments relating to a computer system, which may include a computer chassis, a module computer device, and a removable storage device. In one embodiment, provided is a computer system that includes a computer chassis having at least one slot configured to house one or more removable modular computer devices during use, and a modular computer device having a slot to house a removable storage module. The slot includes an opening in a front panel of the modular computer device that enables the removable storage module to be installed into and removed from the slot while the modular computer device is installed in one or more slots of the computer chassis. The computer system also includes a removable storage module that includes a housing to facilitate sliding of the removable storage module into and out of the slot of the modular computer device, a storage device disposed in the housing during use, and a latching mechanism that is selectively actuated between a locked and an unlocked position to selectively couple the removable storage module within the slot of the modular computer device during use.

In another embodiment, provided is a removable storage module. The removable storage module includes a housing that facilitates sliding of the removable storage module into and out of a slot of a modular computer device, wherein the slot includes an opening in a front panel of the modular computer device that enables the removable storage module to be installed into and removed from the slot while the modular computer device is installed in one or more slots of a computer chassis. The removable storage module also includes a latching mechanism that is selectively actuated between a locked and an unlocked position to selectively couple the removable storage module within the slot of the modular computer device during use.

In yet another embodiment, provided a removable storage device that includes a housing and a latching mechanism. The housing facilitates sliding of the removable storage module into and out of a slot of a modular computer device. The slot includes an opening in a front panel of the modular computer device that enables the removable storage module to be installed into and removed from the slot while the modular computer device is installed in one or more slots of a computer chassis. The latching mechanism is selectively actuated between a locked and an unlocked position to selectively couple the removable storage module within the slot of the modular computer device during use. The latching mechanism is actuated between a locked and unlocked position via rotation of a cam member by less than about three-hundred sixty degrees.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following figures and detailed description. It is intended that all such additional systems, methods, features and advantages be included within this description, be within the scope of the accompanying claims.

BRIEF DESCRIPTION OF THE DRAWINGS

A better understanding of the present invention can be obtained when the following detailed description of the preferred embodiments is considered in conjunction with the following drawings, in which:

FIGS. 3A and 3B are diagrams that include front and rear isometric views of an embodiment of a modular computer device and a removable storage device uninstalled from the modular computer device in accordance with one or more embodiments of the present technique.

FIG. 6A is an illustration of an isometric exploded view of the removable storage device and latching device in accordance with one or more embodiments of the present technique.

FIG. 6B is an illustration of an alternate isometric view of the removable storage device and latching device in accordance with one or more embodiments of the present technique.

FIG. 6C depicts an alternate view of a cam of the latching device in accordance with one or more embodiments of the present technique.

Figure 1:
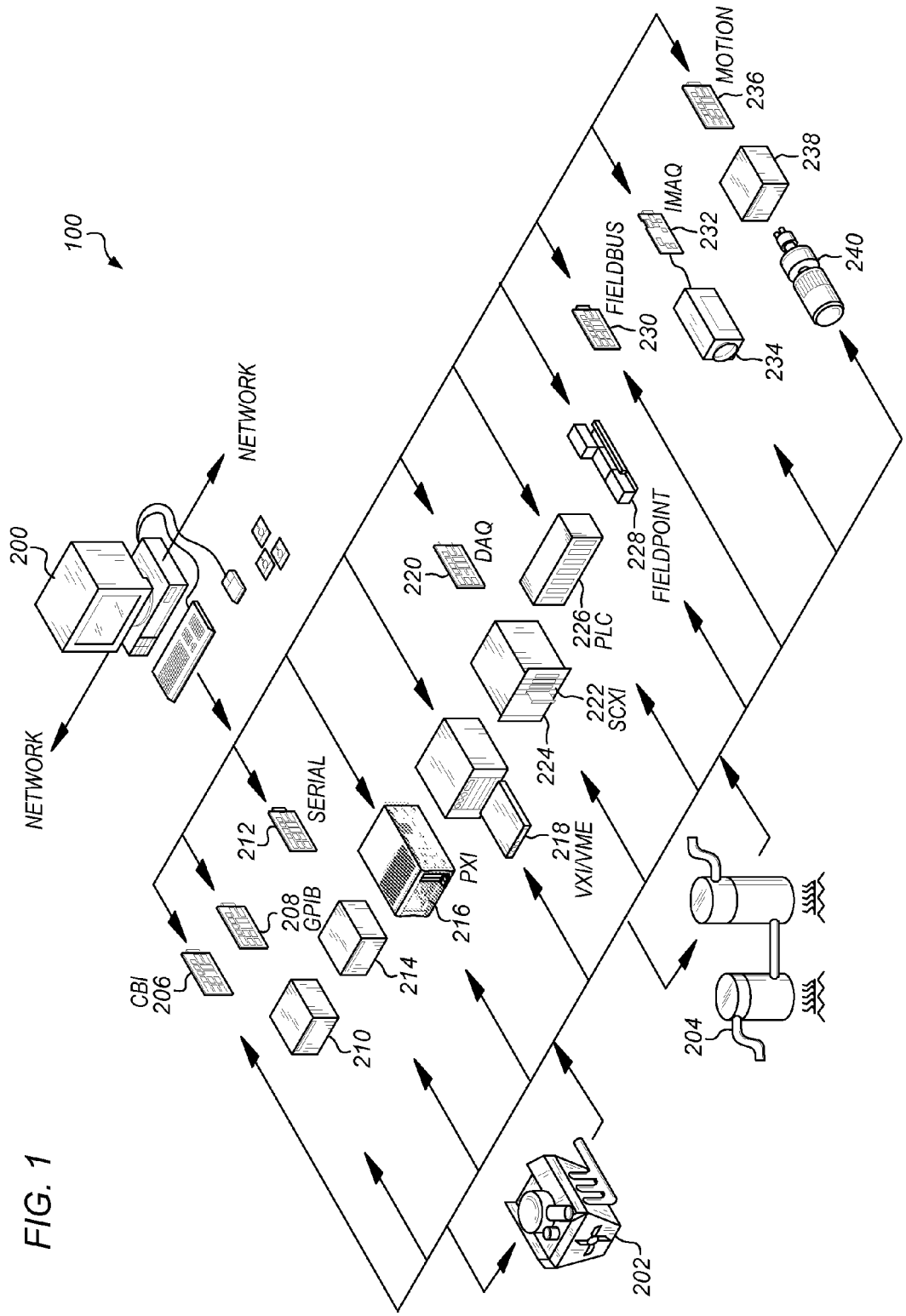
FIG. 1 is a diagram that illustrates a computer system in accordance with one or more embodiments of the present technique.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (e.g., having the potential to, being able to), not a mandatory sense (e.g., must).

DETAILED DESCRIPTION

In the following description, numerous specific details are set forth to provide a thorough understanding of the present technique. However, one having ordinary skill in the art should recognize that the technique may be practiced without these specific details. In some instances, well-known structures and techniques have not been shown in detail to avoid obscuring the present subject matter.

The following description relates to removable storage modules and more particularly to a system and method for removable storages module to be installed in and removed from a computer chassis or similar computer device. In some embodiments, a removable storage module may be part of a computer system that may also include a storage device, a computer chassis, and a modular computer device. In certain embodiments, the removable storage module includes a storage device and a carrier that is capable of being installed into and removed from a modular computer device (e.g., a PXI module, such as a PXI controller module or other PXI module) via a front panel of the modular computer device. Such an embodiment may enable a user to easily remove and install a storage device into a modular computer device without substantial disassembly of the device. In some embodiments, the removable storage module includes an actuated latching mechanism that enables the removable storage module to be selectively coupled within a pocket/slot/recess of the modular computer device that houses the removable storage module. In certain embodiments, the latching mechanism is biased into a locked position, and can be open via rotation of a single cam member by a user. In some embodiments, the cam member is rotated via screw driver, key, or the like. Such embodiments may simplify latching and unlatching of the removable storage device within the pocket/slot/recess of the modular computer device that houses the removable storage module during use.

FIG. 1 illustrates an exemplary measurement/control system ("computer system") 100 that may implement one or more embodiments of the present technique. Computer system 100 may include various combinations of hardware and software that include devices that can be used to implement various computer based processes.

In the illustrated embodiment, computer system 100 includes a host computer system 200. Host computer system 200 may be operable to execute computer programs/routines that provide various computer related functions. Host computer system 200 may include various components such as central processing unit (CPU) and a memory medium. The memory medium may include a tangible non-transitory computer readable storage medium, such as random access memory (RAM), flash memory, hard-drives, and/or CD-ROMs, or the like. The memory medium may have program instructions stored thereon that are executable (e.g., by CPU) to implement one or more computer implemented methods. In the illustrated embodiment, host computer system 200 includes a display device (e.g., a monitor), an alpha-numeric input device (e.g., a keyboard), and a directional input device (e.g., a mouse). In some embodiments, host computer system 200 may include modular and/or plug-in boards/cards (e.g., with either commercially available or proprietary hardware) that may be added via a number of expansion slots internal or external to the computer body. For example, host computer system 200 may include PCI/PCI Express slots and PCI/PCI Express cards disposed therein. As described in more detail below, host computer system 200 may be connected to one or more devices, such as an expansion chassis for connecting to a various number and combination of devices. In certain embodiments, host computer system 200 and/or other portions of computer system 100 may be connected to one or more other devices via a network, such as an internal network (e.g., a local area network (LAN)) and/or an external network (e.g., the internet). In certain embodiments, host computer system 200 may be used for various input/output (I/O) functions and processing tasks. For example, host computer system 200 may be used for data acquisition (DAQ) (e.g., when a DAQ digitizing board is installed in computer 200 or a device coupled thereto, such as a chassis, and associated software is run).

Host computer system 200 may be configured to connect/communicate with other instruments/devices of computer system 100. In some embodiments, host computer system 200 may operate with the one or more devices of computer system 100 to generate and provide data, to acquire data, to analyze data. For example, computer system may communicatively couple to and control one or more devices 202, processes 204, or the like. Host computer system 200 may operate with the one or more devices in communication with device 202 or process 204 to perform an automation function, such as MMI (Man Machine Interface), SCADA (Supervisory Control and Data Acquisition), portable or distributed data acquisition, process control, advanced analysis, or other data acquisition and control functions. For example, computer system 100 may be used to implement data acquisition and control applications, test and measurement applications, image acquisition and processing application, machine vision processing applications, process control applications, man-machine interface applications, simulation applications, hardware-in-the-loop validation applications, motion control applications, computer based instruments (CBI) applications, signal conditioning (SCXI) applications, or the like. One or more of the instruments/devices of computer system 100 may include a programmable hardware element, using an FPGA or a processor and memory, and/or one or more portions of user code.

Computer system 100 may include a variety of devices. For example, computer system 100 may include modular instrumentation devices, such test and measurement devices manufactured by National Instruments Corporation, headquartered in Austin, Tex. In some embodiments, computer system 100 may include computer based instrumentation (CBI) 206, such as a digital multi-meter (DMM), an oscilloscope (SCOPE), a radio-frequency (RF) device (e.g., up-converter or down-converter), an arbitrary waveform generator (ARB), or the like. Computer system 100 may include general purpose interface bus (GPIB) device 208, such as a modular GPIB card used to communicate with a GPIB device 210 (e.g., an oscilloscope) via a GPIB communication protocol. Computer system 100 may include a serial device 212, such as a modular serial card used to communicate with a serial device 214 (e.g., an oscilloscope) via a serial communication protocol. Computer system 100 may include a (PXI) device 216, such as a PXI chassis having PXI form factor modular devices (e.g., modules) installed therein. Computer system 100 may include a (VXI/VME) device 218, such as a VXI/VME chassis having VXI/VME form factor modular devices (e.g., VXI/VME controllers/modules) installed therein. Computer system 100 may include data acquisition (DAQ) device 220, such as modular instrumentation including data input/output (I/O) interfaces for receiving, transmitting, conditioning, and/or processing signals (e.g., digital and analog signals). Computer system 100 may include signal conditioning (SCXI) devices 222 that can be used to condition and/or route signals, such as I/O signals as those transmitted/received at DAQ device 220. SCXI device 222 may include a chassis 224 having devices 222 installed therein (e.g., a relay/switch module). Computer system 100 may include a programmable logic controller (PLC) 226, such as a PLC used for the automation of electromechanical process. Computer system 100 may include a distributed I/O module, such as a fieldpoint module 228. Computer system 100 may include a distributed control module, such as a fieldbus module 230. Computer system 100 may include an image acquisition (IMAQ) system, such as a modular IMAQ module 232 and an associated IMAQ device (e.g., camera) 234. Computer system 100 may include a motion control system, such as a modular motion controller device 236, a motor drive 238, and a motor 240. Computer system 100 may include any variety of other devices. Although some of the devices are illustrated in association with a chassis (e.g., modules) and some are illustrated independent from a chassis (e.g., card or standalone devices), embodiments may include all or some of the described device being provided in a module form factor to be housed in a chassis and/or a card form factor be installed in computer 200. For example, PXI device 216 may include a PXI chassis housing any combination of modular CBI devices, GPIB devices, serial devices, SCXI devices, DAQ devices, IMAQ devices, motion devices, or the like. The devices may also be provided in a PCI form factor and installed in PCI slots of computer 200.

Figure 2:
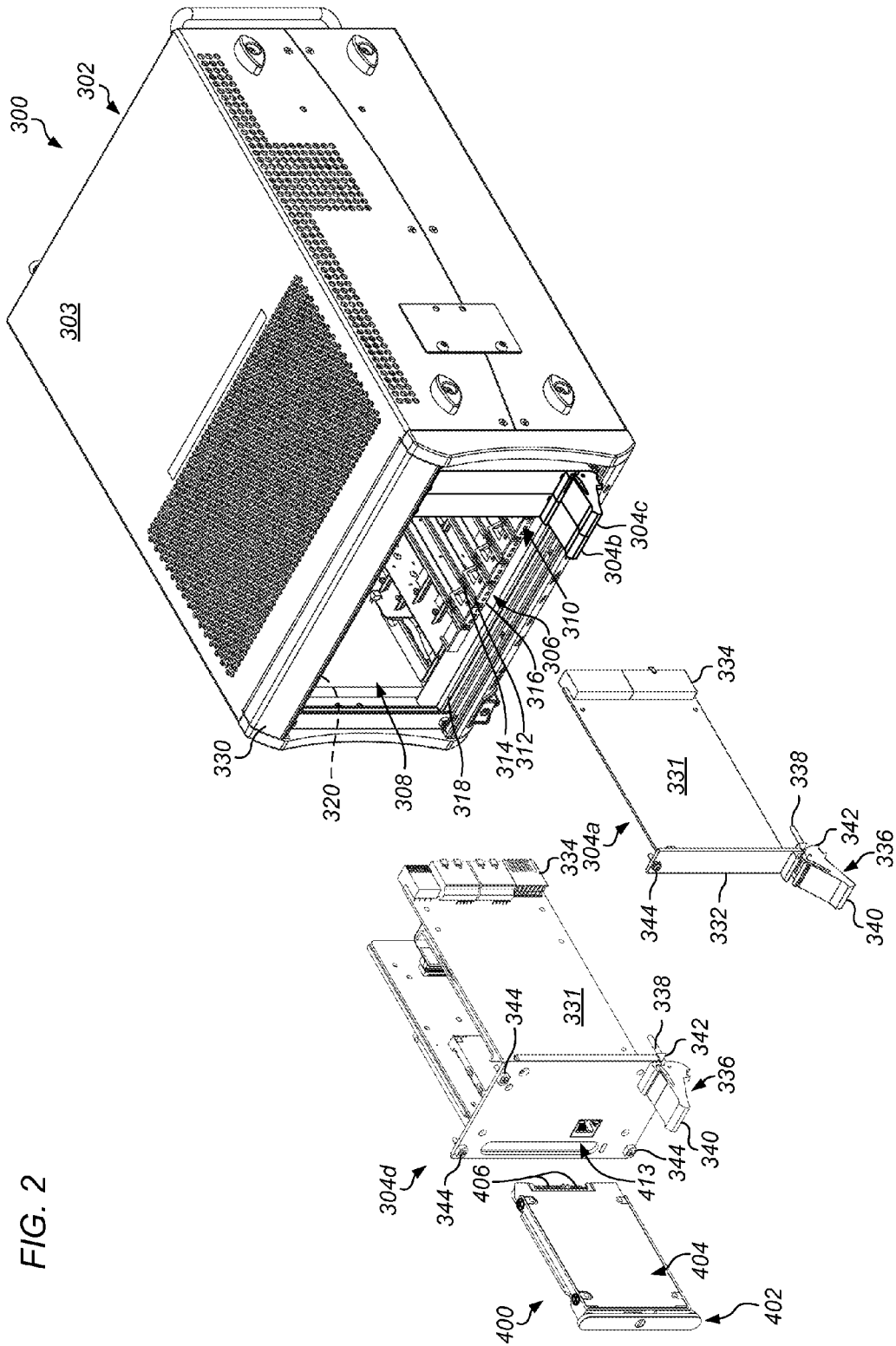
FIG. 2 is a diagram that illustrates a chassis system and modular computers devices in accordance with or more embodiments of the present technique.

FIG. 2 is a diagram that illustrates a chassis system 300 and pluggable computers devices in accordance with or more embodiments of the present technique. In some embodiments, chassis system 300 includes a computer chassis housing one or more modular computer devices. In the illustrated embodiment, chassis system 300 includes a chassis 302. Chassis 302 may include a rigid enclosure having a plurality of slots or bays for housing one or more modular computer devices. In the illustrated embodiment, chassis 302 includes an enclosure 303 having a plurality of internally provided slots 306. More specifically, the illustrated embodiment, chassis 302 includes an eight-slot PXI chassis 302. In the illustrated embodiment, seven of slots 306 are designed to house peripheral modular devices ("modules"), and one slot (to the far left of the illustrated chassis 302) is designed for housing controller devices. In the illustrated embodiment, chassis 302 has two modules 304b and 304c installed two of slots 306. The illustrated embodiment also depicts a module 304a and another module 304d that are currently uninstalled from chassis 302. Other embodiments may include any number of slots and slot configurations.

Modules 304a, 304b, 304c and/or 304d may include "3U" PXI modular devices. Although several of the embodiments described and illustrated herein relate to a PXI chassis system, the techniques described herein may apply to various chassis systems, such as VXI/VME chassis systems, PXIe chassis system or a server rack system. Moreover, the techniques described herein may be applicable to different PXI chassis models (e.g., a chassis having fewer or more than eight slots).

Enclosure 303 may include a rigid frame/housing. In some embodiments, enclosure 303 may be formed of metal, such as one or more sheet of aluminum or steel. As depicted, slots 306 may extend internally into enclosure 303. For example, slots 306 may each extend from an opening 308 at a front end of enclosure 303 toward a rear portion of enclosure 303. In some embodiments, opening 308 is surrounded by a bezel 330 that extends about the top, bottom and/or sides of opening 308. A rear portion of chassis 302 and enclosure 303 may include a backplane that facilitates communication with modules 304a, 304b, and 304c and/or 304d. Thus, a front end of chassis 302/enclosure 303 may be defined as an end of chassis 302/enclosure 303 where modules are inserted and removed. Further, a front end of chassis 302/enclosure 303 may include an end of chassis 302/enclosure 303 where a substantial amount of user accessible input/output (I/O) and/or user interfaces are located during use. A rear end of chassis 302/enclosure 303 may be defined as an end of chassis 302/enclosure 303 comprising a backplane connector that is complementary to connectors of modules 304a, 304b, 304c and/or 304d.

Chassis 302 may include guides 310 coupled to one or more portions of enclosure 303. In some embodiments, guides 310 may include elongated slots/tracks that facilitate installation and retention of modules 304a, 304b, 304c and/or 304d. For example, in the illustrated embodiment, each of guides 310 includes a slot 312, a grounding terminal 314, and alignment holes 316. Slot 312 may includes elongated recess that is engaged by a complementary edge of a printed circuit board (PCB) of module 304a. Engagement of the slot 312 and board edge may guide insertion of module 304a into slot 306. Grounding terminal 314 may include a terminal that engages a complementary grounding contact located at or near an edge of a PCB of an inserted module 304a. Grounding terminal 314 may be electrically coupled to a ground location (e.g., a frame of enclosure 303) to facilitate dissipation of charges from module 304a. In some embodiments, grounding terminal 314 may be located toward a front end of guide 310 such that it is engaged by a complementary grounding connector of module 304a while it is being slid into slot 306 to facilitate the grounding of module 304a occurring prior to full/complete insertion of module 304a into slot 306 (e.g., prior to a connector of module 304a coupling to a complementary backplane connector). Alignment holes 316 may be engaged by a complementary pin/protrusion of module 304a to facilitate alignment of module 304a in slot 306.

Chassis 302 may include one or more rails proximate a front end of the chassis that are used to secure the modular computer devices to the chassis. In the illustrated embodiment, chassis 302 includes a lower front rail 318 and an upper front rail 320 (not visible) that run along the lower edge and upper edge, respectively, of opening 308. The lower front rail 318 and the upper front rail 320 may facilitate installation and securing of modules to chassis 302, as described in more detail below.

Modules 304a, 304b, 304c and/or 304d may include various modular computing devices, such as controller modules, data-acquisition modules, signal generation modules, signal conditioning modules, or the like. For example, modules 304a may include modular storage devices, CBI devices, GPIB devices, serial devices, SCXI devices (such as switches/relays), DAQ devices, IMAQ devices, motion devices, or the like, and module 304d may include a controller module, comprising a central processing unit. Various types and numbers of modules may be provided in single chassis. The ability to mix-and-match various types of modules may facilitate providing a computer system with increased amount of operational flexibility. In some embodiments, a plurality of chassis may be interconnected to provide additional flexibility in configuring a computer system. For example, two eight slot chassis may be interconnected to provide a single system capable of coordinating operation of sixteen modules.

Modules 304a, 304b, 304c and/or 304d may include various physical features that facilitate installation and operation of the module within chassis. For example, in the illustrated embodiment, module 304a includes a PCB 331, a front panel 332, a rear connector 334, and a latching mechanism 336. PCB 331 may mechanically support and electrically couple electronic components (e.g., integrated circuits) using conductive pathways, tracks or traces etched from copper sheets laminated onto a non-conductive substrate, for example. Module 304d also includes a rear connector 334 and PCB 331. Front panel 332 may provide for enclosing at least a respective portion of opening 308 when module 304a is installed in chassis 302. Front panel 332 may include a substantially flat and rigid (e.g., metal) plate that extends from lower front rail 318 to upper front rail 320 when installed. In some embodiments, front panel 332 may provide a location for I/O interfaces (e.g., electrical connectors/plugs) of module 304a. For example, front panel 332 may include one or more I/O connectors that enable communication/data cables to be connected to module 304a via front panel 332. Rear connector 334 may interface with a complementary backplane connector of chassis 302 when module 304a is installed into chassis 302. Rear connector 334 may provide for the communication/transmission of signals with other portions of computer system 100.

In some embodiments, modules 304a, 304b, 304c and/or 304d may be physically installed into chassis 302 by sliding each respective module 304a, 304b, 304c, and/or 304d into one or more slots 306 of chassis 302. For example, a single slot module may be slid into a single slot 306 of chassis 302. A wider module (e.g., a two slot module) may be slid into two or more adjacent slots of chassis 302. Conversely, modules 304a, 304b, 304c, and/or 304d may be physically uninstalled from chassis 302 by sliding each respective module 304a, 304b, 304c, and/or 304d out of one or more slots 306 of chassis 302.

In some embodiments, modules 304a, 304b, 304c, and/or 304d may mechanically couple to chassis 302 to inhibit them from unintentionally sliding out of its respective slot 306. In the illustrated embodiment, for example, module 304a, 304b, 304c and/or 304d each include fastening devices 336 that engage lower front rail 318. Each fastening device 336 may be actuated during installation to facilitate fully seating each of the modules 304. For example, as module 304a, 304b, 304c, and/or 304d is advanced into slot 306, a guiding pin 338 may align with and engage a complementary aligning hole 316 located at a front end of one of guides 310. Once module 304a, 304b, 304c, or 304d is partially inserted, a full seating of may be accomplished by actuating fastening device 336 to draw module 304a, 304b, 304c, and/or 304d into the fully seated/installed position. For example, in the illustrated embodiment, fastening device 336 includes a lever 340 that is moved upward to cause fingers 342 to engage lower front rail 318 of chassis 302. More specifically, as lever 340 is advanced upward, fingers 342 engage a rear edge/lip of lower front rail 318 to pull/draw module 304a, 304b, 304c, and/or 304d into a seated/installed position within slot 306. In the illustrated embodiment, modules 304b and 304c are fully inserted, as indicated by lever 340 being disposed in the up position. In some embodiments, engagement of fastening device 336 may help to ensure that module 304 is completely installed into chassis 302 (e.g., that rear connector 334 of module 304 has fully engaged a complementary backplane connector of chassis 300). Fastening device 336 may or may not include a locking mechanism that prevents a user from removing the module from chassis 302.

In some embodiments, modules 304a, 304b, 304c, and/or 304d may be coupled to chassis 302 using a variety of fasteners. For example, in the illustrated embodiment, modules 304a, 304b, 304c, and/or 304d may be coupled to chassis 302 using a threaded fastener (e.g., a screw) 344 that extends through a top end of front panel 332. When installed, screw 344 is fastened to a complementary threaded hole in upper front rail 320. Screw 344 may include a common type of screw, such as a Phillips head, flat-head, hex-head screw that can be tightened or loosened using a common tool, such as a screw driver or an Allen wrench. In some embodiments, a module may be coupled to chassis 302 using a combination of techniques. For example, in the illustrated embodiment, modules 304a, 304b, 304c, and/or 304d may be coupled to lower front rail 318 via fastening device 336, and may be also fastened to upper front rail 320 via screw 344. Other embodiments may include any combination of fasteners. For example, modules 304a, 304b, 304c, and/or 304d may be coupled to chassis 302 using any combination of screws at both top and/or bottom ends of front panel 332, fastening devices 336 at the top and/or bottom ends of the respective module. The fasteners may not be keyed, such that modules 304*a*, 304*b*, 304*c*, and/or 304*d* may be removed using common tools, such as a screwdriver.

In some embodiments, at least one of the modular computer devices (e.g., 304*a*, 304*b*, 304*c*, and/or 304*d*) may include a pluggable controller device or similar modular device that makes use of a storage device, such as a hard-drive. For example, module 304*d* may include a controller that includes a hard-drive for storing data and programs that facilitate operation of the device. In some embodiment at least one of the modular computer devices (e.g., 304*a*, 304*b*, 304*c*, and/or 304*d*) may include one or more removable storage devices. For example, in the illustrated embodiment, module 304*d* includes a removable storage device ("removable storage module") 400. In some embodiments, a removable storage device may include a storage device as well as a housing that facilitate coupling of removable storage device with a respective module. For example, in the illustrated embodiment, removable storage device 400 includes a housing 402 having a storage device 404 disposed therein.

Figure 3B:
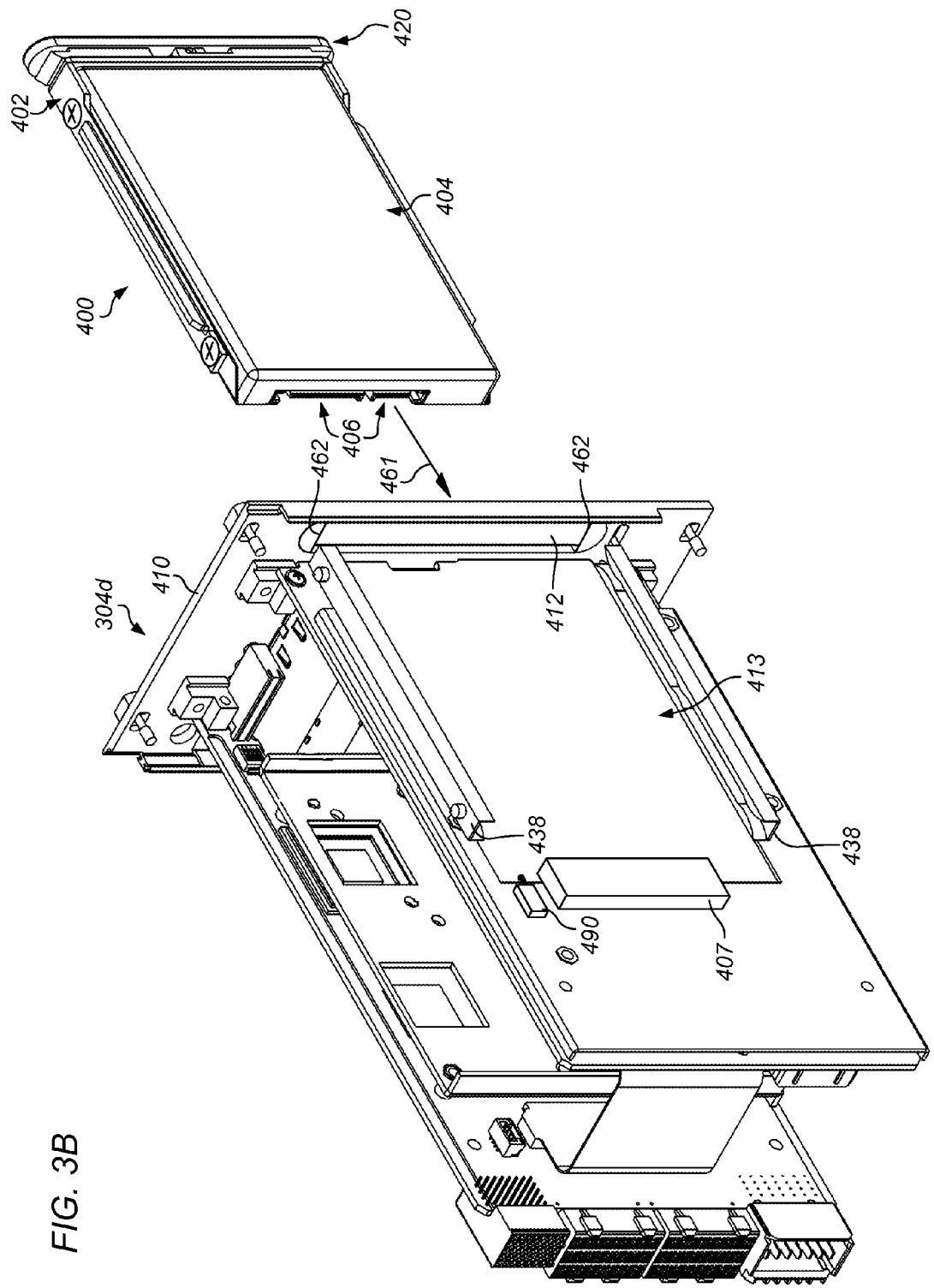
Figure 4A:
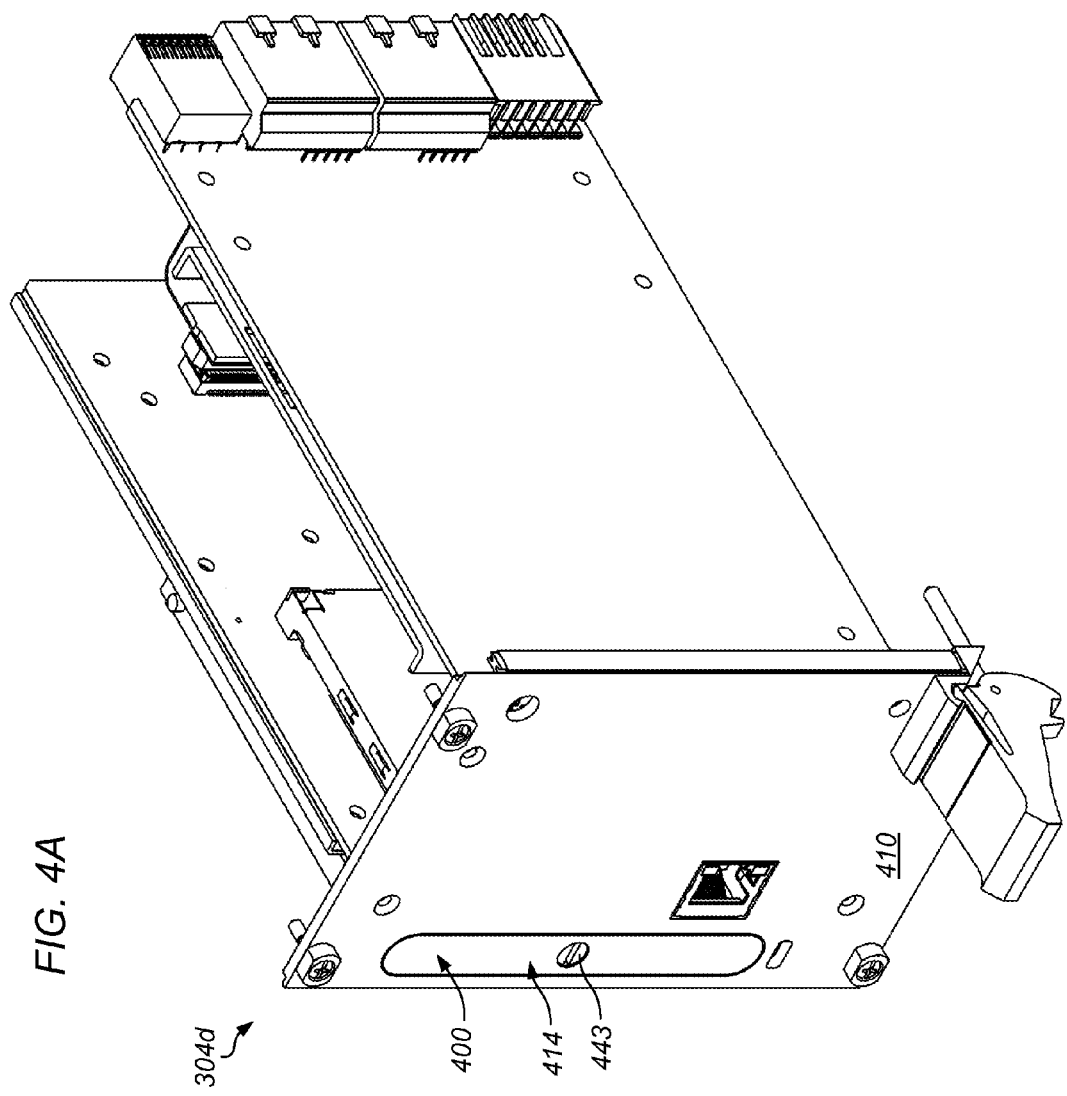
FIGS. 4A and 4B are diagrams that include front and rear isometric views of an embodiment of the removable storage device installed in the modular computer device in accordance with one or more embodiments of the present technique.
Figure 4B:
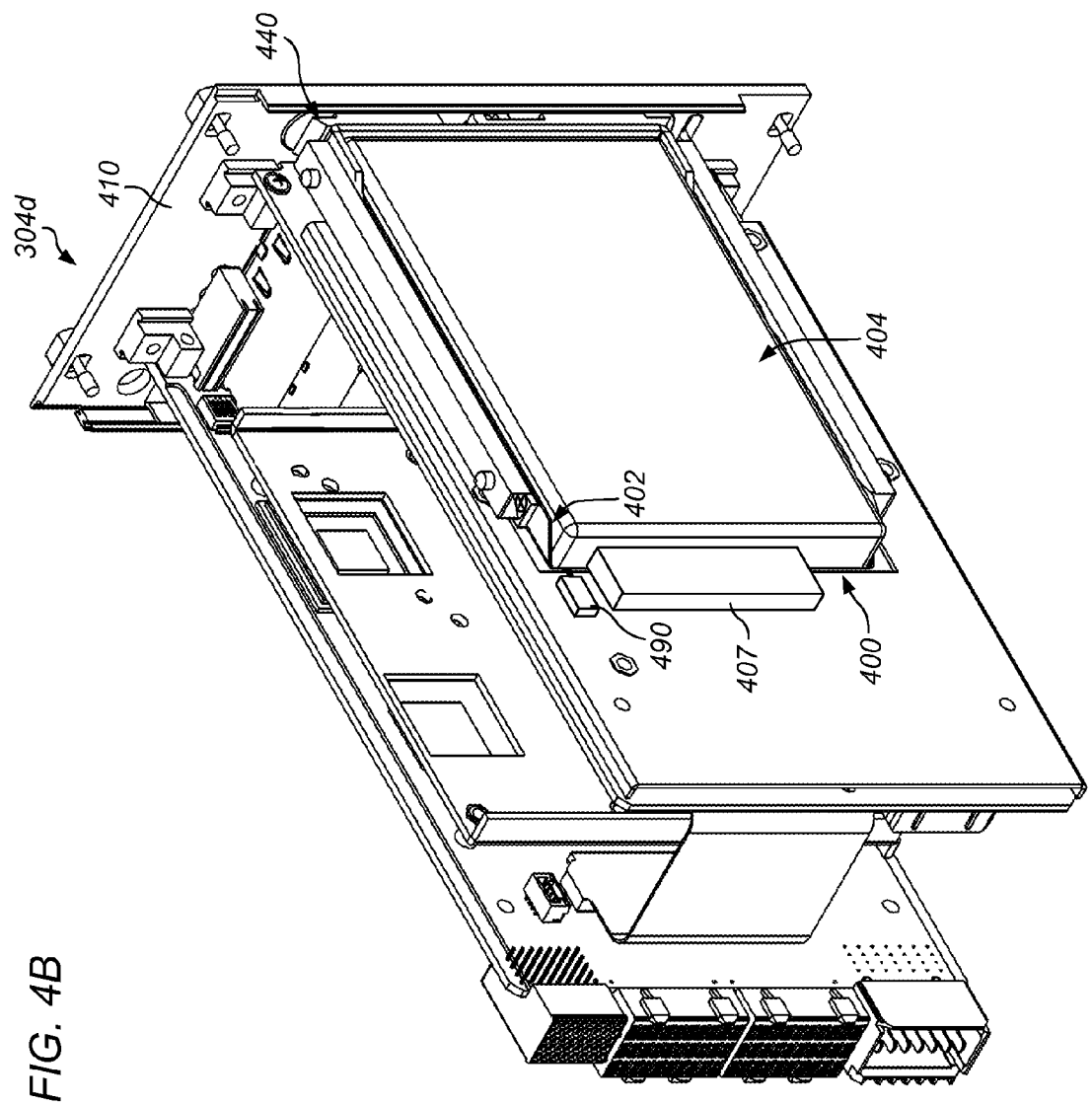
Figure 5A:
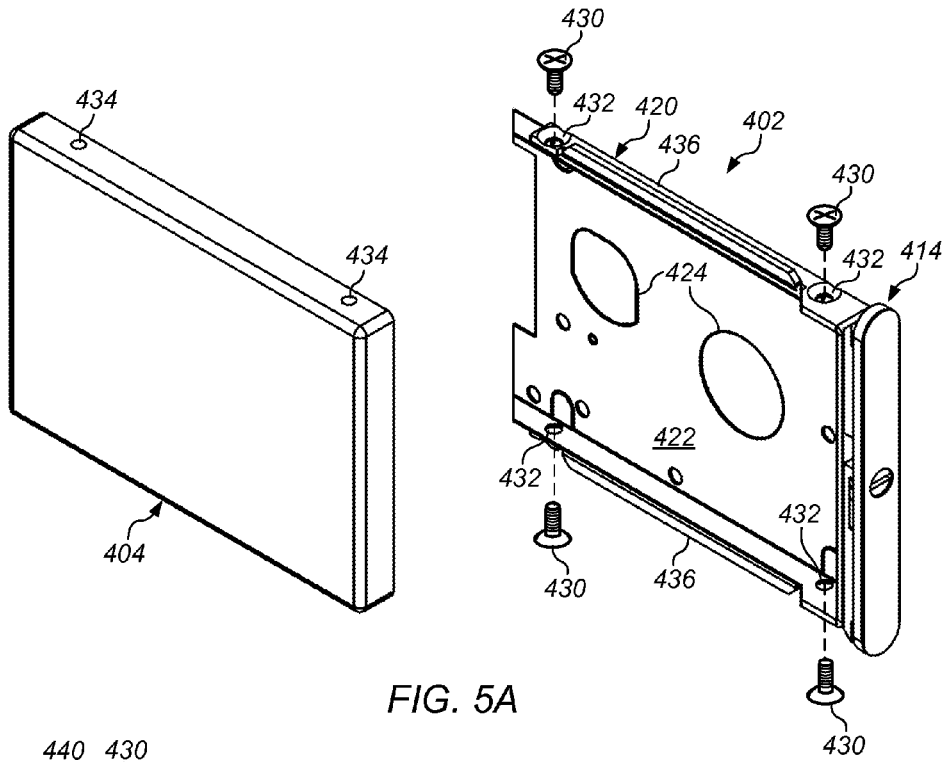
FIGS. 5A and 5B are illustrations that depict isometric views of the removable storage device in accordance with one or more embodiments of the present technique.
Figure 5B:
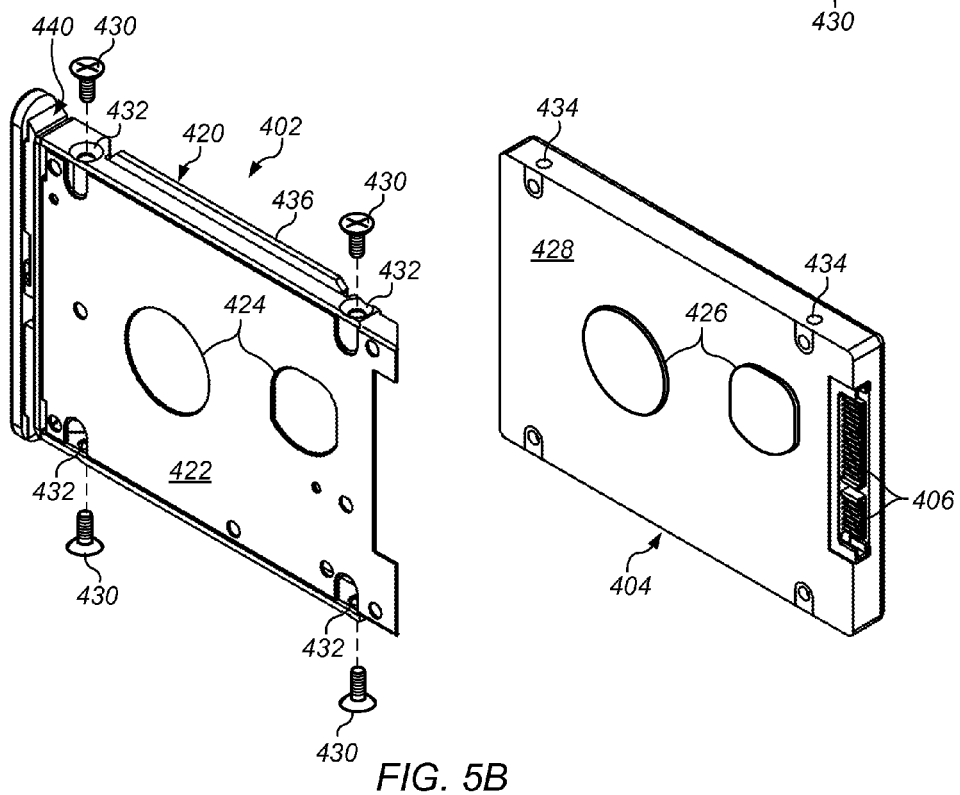

FIGS. 3A and 3B are diagrams that include front and rear isometric views of modular computer device 304*d* and a removable storage device 400 uninstalled from modular computer device 304*d* in accordance with one or more embodiments of the present technique. FIGS. 4A and 4B are diagrams that include front and rear isometric views of removable storage device 400 installed in modular computer device 304*d* in accordance with one or more embodiments of the present technique. FIGS. 5A and 5B are illustrations that depict isometric views of various components of removable storage device 400 in accordance with one or more embodiments of the present technique. Although several of the illustrated relate to module 304*d*, similar techniques may be employed on other modular computer devices, such as modules 304*a*-304*c* described above.

In some embodiments, storage device 404 includes a tangible non-transitory computer readable storage medium for storing data, such as program instructions. For example, storage device 404 may include non-volatile storage device, such as a hard-disk-drive (HDD). Storage device 404 may include rotating or solid state media. Storage device 404 may include a card for cabling to an external storage device, such as an external HDD. Some embodiments may employ one or more other types of storage devices, such as flash memory. Although several embodiments are described with regard to a storage device, the techniques described herein may be applied to other computer components that a user may desire to install and remove quickly, such as a peripheral card, network card, or the like.

In certain embodiments, storage device 404 may include storage device connector that couples to a complementary connector of module 304*d*. For example, in the illustrated embodiment, storage device 404 includes storage device connector 406 that coupled to a complementary connector 407 of module 304*d*. In some embodiments, connector 406 may be mated (e.g., mechanically and communicatively coupled) to complementary connector 407 upon full insertion of removable storage device 402 into a slot modular computer device 400. Storage device connector 406 may provide for the communication/transmission of signals between storage device 404 and module 304*d*, as well as other portions of computer system 100. In some embodiments, connector 407 may be movable to capture storage device connector 406. For example connector may have some amount of positional float such that connector 407 may move slightly to couple with storage device connector 406. The positional float may be of a sufficient amount to overcome offsets in positions due to expected mechanical tolerance stack-ups and slight variations in position as removable storage device 400 is advanced into the corresponding slot. Connector 407 may be rigidly mounted such that the connection to storage device connector 406 is made as removable storage module 400 is slid into the slot, without a user having to make the connection manually (e.g., via plugging in a ribbon cable).

In some embodiments, removable storage device 400 may be physically installed into a module by sliding removable storage device 400 into a slot of the module. For example, in the illustrated embodiment, module 304*d* includes a front panel 410 having an opening 412 extending there through. Opening 412 may provide access to and/or define at least a portion of a slot 413 that receives removable storage module 400 for installation within module 304*d*. During use removable storage module 400 may be slid into and out of slot 413 via opening 412 of front panel 410. Thus, a user may install or uninstall removable storage device 400 without having to remove module 304*d* from a chassis (e.g., chassis 300), remove cables and/or even have to power down the system.

In some embodiments, a front panel opening 412 may be sized to provide for complete insertion of removable storage module 400 such that removable storage module 400 does not extend from front panel 410 when installed. For example, as depicted in FIG. 4A, when removable storage module 400 is fully inserted into slot 413, a face of front panel 414 (e.g., overlay 454 described in more detail below) of removable storage device 400 may be provided substantially flush with front panel 410 of modular computer device 400. Such a flush mount may be both aesthetically pleasing and functional; the flush mount may protect removable storage module 400 from being bumped/snagged inadvertently during activity at or near a face of module 304*d*.

In some embodiments, storage device 404 may be coupled to housing 402. Housing 402 may protect storage device 404 during use and/or may guide insertion and removal of storage device 404 within slot 413. Housing 402 may enclose some, substantially all or all of storage device 404. As depicted in FIGS. 5A and 5B, housing 402 may include one or more members forming a U-shaped frame 420. Frame 420 may enclose three of four edges of the storage device 404 when storage device 404 is disposed within frame 420. An opening in a rear of frame 420 may be provided to facilitate access to storage device connector 406 during use. In some embodiments, the opening is provided by the rear opening of the U-shape of frame 420.

In some embodiments, housing 402 includes a cover 422. Cover 422 may be disposed over an exposed portion/surface of storage device 404 when storage device 404 is disposed within frame 420. In some embodiments, cover 422 may protect a printed circuit board exposed on one side of storage device 404. As depicted in FIGS. 5A and 5B, cover 422 may include a relatively thin sheet of material that is recessed within the edges of frame 420. Such an embodiment may help to reduce the overall thickness of removable storage module 402. In some embodiments, cover 422 may include a solid or substantially solid sheet of material that is coupled to or formed integral with frame 420. Frame 420 may be formed of sheet metal material, cold roll steel, plastic, or the like. In certain embodiments cover 422 may include a plastic liner, which may be an anti-static polycarbonate material. In certain embodiments, cover 422 may be made of sheet metal material.

In some embodiments, cut-outs may be provided within cover 422 to enable protrusions of storage device 404 to extend there through. For example, as depicted in FIGS. 5A and 5B, cover 422 may include a plurality of cutouts 424. When assembled, cutouts 424 may align with protrusions (e.g., raised surfaces) 426 located on an exposed surface 428 of storage device 404 such that the protrusions 426 may be disposed within the cutouts 424. In some embodiments, cover 422 may have a thickness that is about the same, the same, or less than the height of the protrusions (e.g., the distance they extend from surface 428 of storage device 404), such that the total thickness of cover 422, storage device 404, and frame 420 may be about the same, the same or less than the thickness of storage device 404. Thus, removable storage module 402 may have a footprint that is about the same as storage device 404. Such an embodiment may enable module 304*d* to remain compact. In some embodiments, cover 422 may include a substantially solid sheet of material. For example, cover 422 may include a substantially flat sheet of material that may be positioned above protrusions 426. In some embodiments, cover 422 may be positioned away from surface 428 by a distance about the same or greater than the height of protrusions 426. In such embodiments, cutouts 424 may not be needed as cover 422 is positioned away from surface 428, thereby providing clearance for protrusions 426.

In some embodiments, storage device 404 may be coupled to housing 402 using a variety of fasteners. For example, in the illustrated embodiments, storage device 404 is coupled to housing 402 using four threaded fasteners 430. Threaded fasteners 430 may include screws, such as Phillips head, flat-head, or hex-head screws that can be tightened or loosened using a common tool, such as a screw driver or an Allen wrench. In some embodiments, threaded fasteners 430 may pass though holes 432 in housing 402 and may be secured to complementary threaded holes 434 of storage device 404 (See FIGS. 5A and 5B). Holes 432 of housing 402 may be provided in accordance with a standard layout-out of mounting holes for the same or similar devices, such that storage device 404 may easily be swapped for another device. In some embodiments, a plurality of hole patterns may be provided to enable different types of devices to be coupled to housing 402. In some embodiments, screws may be secured from a side of storage device 404 through cover 422.

In some embodiments, removable storage module 400 may include one or more guides that facilitate insertion of removable storage module 400 into slot 413. For example, in the illustrated embodiments, frame 420 includes guide rails 436 that engage one or more complementary elongated tracks 438 in slot 413 that may facilitate installation and retention of removable storage device 402. In some embodiments, guide rails 436 and complementary elongated tracks 438 may facilitate retention of storage device 402. For example, guide rails 436 and elongated tracks 438 may include a friction/interference-fit that may inhibit removable storage module 400 from inadvertently sliding out of slot 413. In some embodiments, the friction/interference-fit may be provided by one or more biased members extending from rails 436 and/or elongated tracks 438. In some embodiments, the friction/interference-fit may be provided by a portion of rails 436/elongated tracks 438 that may be wider than a corresponding portion of elongated tracks 438/rails 436. In some embodiments, slot 413 may include rails and frame 420 may include slots that are complementary to the rails of slot 413. In some embodiments, tracks 438/rails 436 may be used to ground frame 420 and/or ground storage device 402 via frame 420.

In some embodiments, removable storage module 400 may include one or more latching mechanisms that can be used to selectively secure removable storage device 400 within slot of 413 of module 304*d* via one or more latching devices. FIG. 6A is an illustration of an isometric exploded view of housing 402 and a latching mechanism 440 in accordance with one or more embodiments of the present technique. FIG. 6B is an illustration of an alternate isometric view of housing 402 and a latching mechanism 440 in accordance with one or more embodiments of the present technique.

Latching mechanism 440 may be substantially flush with a front panel of the controller such that it does not extend very far into or out of the controller. In the illustrated embodiment, latching mechanism 440 includes two latching members 442*a* and 442*b* that may be actuated via rotation of a cam 443. Each of latching members 442*a* and 442*b* may include a first end 444, a second end 445 acted on by a bias member 446, and a guide channel 447. In some embodiments, bias member 446 may include a spring or similar resilient member that provides a restoring force to expand members 442*a* and 442*b*. Guide channel 447 may be engaged by one or more guides 448 (e.g., protrusions) that extend from a front portion of frame 420. Each of latching members 442*a* and 442*b* may be retained about guides 448 via a front plate 450 of front panel 414 that is secured to protrusions 448 via screws 452, and/or another fastener, such an adhesive. Components of latching mechanism 440 may be made of a machined material, cast aluminum, cast iron, cast zinc, another alloy or injection molded plastic.

In some embodiments, overlay 454 may be provided over a front face of front panel 450. Overlay 454 may cover screws 452 when assembled to front plate 450. In certain embodiments, overlay 454 may attach to front plate 450 with adhesive. In some embodiments, the color of overlay 454 may match the color of module 304*d*. In certain embodiments, the shape of overlay 454 may be substantially the same as the shape of front plate 450. Front plate 450 may be the same shape and slightly smaller size as the front plate on 304*d*. Grounding tabs or gaskets may also be added to the front plate of module 304*d* or even to front plate 450 to protect against ESD or emissions.

In some embodiments, latching mechanism may be biased to a locked position. For example, in the illustrated embodiment, bias members 446 may be provided in compression, thereby exerting a force that urges first ends 444 of members 442*a* and 442*b* away from one another. More specifically, a second end 445 of each of members 442*a* and 442*b* may include a cut-out that may form L-shaped extensions that may be disposed in a lateral and longitudinal overlapping relationship with respect to one another. Each of bias members 446 may be disposed between an end surface 460 of second ends 445 for a respective member 442*a* and 442*b* and an interior surface 459 of cut-out of the other of the respective members 442*a* and 442*b*. Thus, each of biasing members 446 may urge members 442*a* and 442*b* in opposite directions such that they move outward in the direction of arrows 463. During use, first ends 444 may engage a complementary interior surface (see FIGS. 3A and 3B) of module 304*d* (e.g., a lip/edge 462 as described in more detail below) such that it is retained within slot 413 when members 442*a* and 442*b* are extended outward in opposite directions. Such a position may be referred to as the locked position. In certain embodiments, when removable storage module 400 is installed in slot 413, the locked position is associated with the front face (e.g., overlay 454) of front panel 414 of removable storage device 400 being flush with the surface of front panel 410 with latching members 442*a* and 442*b* engaging a complementary portion (e.g., interior surface 459) of module 304*d*. In some embodiments, storage device connector 406 may be mechanically and communicatively coupled to complementary connector 407 when modular computer device 400 is in the fully seated/installed position and is secured by locking mechanism 440 in the locked position.

In some embodiments, as removable storage module 400 is slid into slot 413 (in the direction of arrow 461, as shown in FIGS. 3A and 3B), ramped/angled surfaces at first ends 444 may engage one or more lips/edges 462 of slot 413. As lips/edges 462 move along the ramped/angled surfaces, an inward force may be provided on the ramped/angled surfaces that may counter and overcome the biasing force provided by biasing members 446, thereby causing members 442a and 442b to move inward (e.g., contract) toward one another into a retracted position. Once the ramped/angled surfaces of first ends 444 is advanced past lip/edge 462, members 442a and 442b may expand outward into the locked position. In some embodiments, in the expanded/locked position, a recess in first end 444 engages a rear side of the lip/edge 462 to inhibit removable storage module 400 from sliding out of slot 413.

In some embodiments, cam 443 may be actuated to urge members 442a and 442b into the unlocked position such that removable module device 400 may be slid out from slot 413. As depicted in FIG. 6C, cam 443 may include a rotational axis 469, an elongated protrusion 470 that extends laterally across a rear face 472 of cam 443 in a direction substantially perpendicular to rotational axis 469, and an elongated cylindrical protrusion 474 that extends in a longitudinal direction away from rear face 472 and parallel and concentric to rotational axis 469. When cam 443 is assembled to latching mechanism 440, protrusion 470 may be disposed into gap between interior faces 478 of the L-shaped legs of second ends 445 of members 442a and 442b. Thus, protrusion 470 may be disposed in a substantially horizontal orientation between a substantially horizontal gap 476 formed between interior faces 478 of second ends 445. Members 442a and 442b may be biased downward by biasing members 446, as discussed above, such that interior faces 478 of second ends 445 contact top and bottom surfaces of protrusion 470. That is, protrusion 470 is sandwiched between interior faces 478 the L-shaped members of second ends 445. Rotation of cam 443 in either direction may result in protrusion 470 rotating from the substantially horizontal orientation to an angle relative to the horizontal, thereby causing protrusion 470 to contacting and exert a force on interior faces 478 of both members 442a and 442b. As cam 470 rotates, the angle of protrusion 470 will increase, urging interior faces 478 away from one another into a retracted position. Where module 400 is disposed in slot 413 with first ends 444 of members 442a and 442b are secured by lip/edge 462, cam 470 may be rotated a sufficient amount to cause first ends 444 to retract to clear lip/edge 462 such that first ends 444 disengage lip/edge 462 and removable storage module 400 may be removed from slot 413; this may be referred to as the unlocked position.

In some embodiments, latching mechanism 440 may be actuated between the locked and unlocked position via about one full rotation or less (e.g., about or less than about three-hundred sixty degrees. For example, latching mechanism 440 may be actuated between the locked and unlocked position via about a forty-five to eighty degree (e.g., seventy degree) rotation of cam 443 clockwise or counterclockwise. In some embodiments, protrusion 474 may be disposed in hole 480 of frame 120 to support cam 443 while it is rotated. Such support may help maintain the location of cam 443, thereby ensuring that latching members retract in a substantially equal amount as cam 443 is rotated. Once a torque used to rotate cam 443 is released, the biasing force generated by biasing members 446 and acting on protrusion 470 via interior faces 478 may urge protrusion 470 back into the horizontal orientation and returning latching mechanism 440 to the locked position. Protrusion 484 may be of a slightly smaller diameter than the center hole in front panel 450. Protrusion 472 may be of a larger diameter than the center hole. This may enable cam 443 to be captured between the front panel 450 and the U-shaped frame 420 without binding, and it may provide a second rotational support for the cam 443, with the first support being protrusion 474 in hole 480.

In some embodiments, fasteners may be used to secure module 402 in place. In some embodiments, a front face 482 of cam 443 includes an engagement feature that can be engaged and rotated by a user to actuate locking mechanism 440. For example, as depicted in FIG. 6B front face 482 includes front face slot 484 that may be engaged by a flat-headed screw-driver, thereby enabling a user to apply a torque sufficient to rotate cam 443 and unlock locking mechanism 440. In some embodiments engagement feature may include any variety of interfaces that enable a user to rotate cam 443. For example, front face 482 may include standard tool interface, such as a torx, a hex, or a tamperproof. In some embodiments, an engagement feature may be keyed such that only an authorized user having access to the key device may be able to rotate cam 443. Accordingly, removal of removable storage device 400 from module 402 may require that a user have access to the key device to unlock the latching mechanism 440. The user may engage the keyed cam 443 to actuate locking mechanism 440 from the locked/extended position to the unlocked/retracted position to facilitate removal of removable storage device 400 from slot 413 of module 400. In some embodiments, the unlocked position may be associated with the front face 414 of removable storage device 400 protruding from a surface of front panel 410.

In some embodiments, removable storage module 400 may be spring loaded outwards when disposed in slot 413. In some embodiments, a bias device may be coupled to memory device 400 and/or part of the controller. For example, a bias mechanism 490 (see FIG. 3B) may be disposed in slot 413 and may be compressed by a back-end of removable storage module 400 when the removable storage module is installed in slot 413. Thus, where removable storage device 400 is secured by latching mechanism 440, and latching mechanism is unlocked, bias member 490, such as a spring, may urge removable storage module 400 to slide at least partially out of slot 413. As a result, removable storage device 400 may be "popped outward," such that a front portion of removable storage device 400 protrudes from front panel 410 of module 304d, thereby permitting the user to grab a front portion (e.g., front panel 414) of removable storage device 400 with their fingers. In some embodiments, upon the unlocking of latching device 440, removable storage device 402 may be held in slot 413 via friction until the user slides removable storage device 400 out of slot 413. In some embodiments, a handle or similar member may be provided regardless of whether or not module 400 is biased outward.

In some embodiments, a lock may be included which prevents module 400 from being removed at certain times. This may be a solenoid pin on the controller which interfaces with a hole on the frame, or inhibits operation of cam 443. Software may also inform the user when it is not acceptable to remove module 400. In some embodiment, a sensor or other I/O may indicate to the system that module 400 is correctly inserted. In some embodiments, circuitry in module 400 and/or other portions of a module or chassis housing module 400, may triggers LED's indicating to the user when it is safe or unsafe to remove module 400.

The removable storage device and systems features and functions described herein provide for a removable storage system and method. Although various embodiments which incorporate the teachings of the present disclosure have been shown and described in detail herein, those skilled in the art may readily devise many other varied embodiments that still incorporate these teachings. The foregoing description of exemplary embodiments, therefore, is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein, but is to be accorded the widest scope consistent with the principles and novel features disclosed herein. Although the embodiments above have been described in considerable detail, numerous variations and modifications will become apparent to those skilled in the art once the above disclosure is fully appreciated. It is intended that the following claims be interpreted to embrace all such variations and modifications. Furthermore, note that the word "may" is used throughout this application in a permissive sense (e.g., having the potential to, being able to), not a mandatory sense (e.g., must). The term "include", and derivations thereof, mean "including, but not limited to". As used in this specification, the singular forms "a", "an" and "the" include plural referents unless the content clearly indicates otherwise. Thus, for example, reference to "a device" includes a combination of two or more devices. The term "coupled" means "directly or indirectly connected".

I claim:

1. A computer system, comprising:
    a computer chassis comprising at least one slot configured to house one or more removable modular computer devices during use;
    a modular computer device comprising a slot configured to house a removable storage module, wherein the slot comprises an opening in a front panel of the modular computer device that enables the removable storage module to be installed into and removed from the slot while the modular computer device is installed in one or more slots of the computer chassis; and
    a removable storage module, comprising:
        a housing configured to facilitate sliding of the removable storage module into and out of the slot of the modular computer device;
        a storage device disposed in the housing during use; and
        a latching mechanism that is configured to be selectively actuated between a locked and an unlocked position to selectively couple the removable storage module within the slot of the modular computer device during use.

2. The system of claim 1, wherein the storage device comprises a hard disk drive.

3. The system of claim 2, wherein the hard disk drive is substantially enclosed by the housing.

4. The system of claim 1, wherein the computer chassis comprises a PXI chassis.

5. The system of claim 1, wherein the modular computer device comprises a PXI modular device.

6. The system of claim 1, wherein the latching device is disposed proximate a front end of the housing and a storage device connector is disposed proximate a rear end of the housing, opposite the front end.

7. The system of claim 1, wherein the latching device comprises a latching member configured to engage a complementary lip proximate the opening in a front panel of the modular computer device.

8. The system of claim 1, wherein the housing comprises a rail/track configured to engage a complementary track/rail of the slot of the modular computer device during use.

9. The system of claim 1, wherein the removable storage module is biased such that the removable storage module moves outward from the slot of the modular computer device when the latching mechanism is unlocked.

10. The system of claim 1, wherein the latching mechanism is actuated between a locked and unlocked position via rotation of a cam member by less than about three-hundred sixty degrees.

11. A removable storage module, comprising:
    a housing configured to facilitate sliding of the removable storage module into and out of a slot of a modular computer device, wherein the slot comprises an opening in a front panel of the modular computer device that enables the removable storage module to be installed into and removed from the slot while the modular computer device is installed in one or more slots of a computer chassis; and
    a latching mechanism that is selectively actuated between a locked and an unlocked position to selectively couple the removable storage module within the slot of the modular computer device during use.

12. The removable storage device of claim 11, wherein the modular computer device comprises a PXI modular device.

13. The removable storage device of claim 11, wherein the latching device is disposed proximate a front end of the housing and a storage device connector is disposed proximate a rear end of the housing, opposite the front end.

14. The removable storage device of claim 11, wherein the latching device comprises a latching member configured to engage a complementary lip proximate the opening in a front panel of the modular computer device.

15. The removable storage device of claim 11, wherein the housing comprises a rail/track configured to engage a complementary track/rail of the slot of the modular computer device during use.

16. The removable storage device of claim 11, wherein the removable storage module is biased such that removable storage module moves outward from the slot when the latching mechanism is unlocked.

17. The removable storage device of claim 11, wherein the latching mechanism is actuated between a locked and unlocked position via rotation of a cam member by less than about three-hundred sixty degrees.

18. The removable storage device of claim 11, further comprising a hard disk drive wherein the storage device comprises a hard disk drive configured to be disposed within the housing during use.

19. A removable storage device, comprising:
    a housing configured facilitate sliding of the removable storage module into and out of a slot of a modular computer device, wherein the slot comprises an opening in a front panel of the modular computer device that enables the removable storage module to be installed into and removed from the slot while the modular computer device is installed in one or more slots of a computer chassis; and
    a latching mechanism that is selectively actuated between a locked and an unlocked position to selectively couple the removable storage module within the slot of the modular computer device during use, wherein the latching mechanism is actuated between a locked and unlocked position via rotation of a cam member by less than about three-hundred sixty degrees.

20. The removable storage device of claim 19, wherein the latching mechanism comprises two latching members configured to engage a complementary portion of the modular computer device to secure the removable storage device in the slot of the modular computer device, wherein the latching member is biased into a locked position, and wherein rotating the cam member causes the latching member to contract into an unlocked position.

* * * * *